Patented June 20, 1944

2,351,763

UNITED STATES PATENT OFFICE 2,351,763

PREPARATION OF MERCAPTANS

Carl Max Hull, Chicago, Ill., assignor to Standard Oil Company, Chicago, Ill., a corporation of Indiana No Drawing. Application February 16, 1942, Serial No. 431,081

16 Claims. (Cl. 260—609)

This invention relates to improvements in the preparation of mercaptans and more particularly to the preparation of aliphatic or cyclo aliphatic mercaptans.

The preparation of mercaptans by treating alkyl halides with alkali hydrosulfides is well known to those versed in the art; however this method requires a plurality of steps and produces a product which is a mixture of mercaptans and alcohols which are difficult to separate and results in low yields of mercaptans. It is also known to prepare mercaptans by reacting an olefin with hydrogen sulfide. This latter method requires the use of catalysts, complicated pressure equipment, and results in a product having a large percentage of undesirable by-products.

It is an object of the present invention to provide a method of preparing mercaptans from olefins which gives a high yield of mercaptans and which results in substantially no additional by-products which are difficult to separate from the desired mercaptans. Another object of the invention is to provide a method of preparing mercaptans from olefins which does not require the use of catalysts and which gives a high yield of mercaptans, without the formation of undesirable by-products.

Other objects and advantages of the present invention will become apparent from the following description thereof.

I have discovered that the foregoing objects can be attained by the preparation of mercaptans by the process comprising the reaction of phosphorus pentasulfide with an unsaturated hydrocarbon and subsequent hydrolysis of the resulting reaction product. The unsaturated hydrocarbons employed are taken from the general class of hydrocarbons containing one or more non-benzenoid double bonds, and preferably those having from 2 to about 12 carbon atoms in a molecule. The term "unsaturated hydrocarbon" as used herein and in the appended claims includes olefins, dienes, polyenes, unsaturated alicyclic hydrocarbons, and derivatives of the above-mentioned classes of hydrocarbons having substituent groups which are substantially inert under the conditions of my process. For example, the unsaturated hydrocarbon may contain one or more hydrocarbon substituents such as cycloaliphatic or aromatic groups. Other inert groups or atoms such as the halogens may also be present.

While all of the above-mentioned unsaturated hydrocarbons and derivatives will react in my process to give mercaptans, I prefer to employ unsaturated hydrocarbons having the type formula

R—CH=CH—R' where R and R' are radicals taken from the class including hydrogen, alkyl, aryl, aromatic- or alicyclic-substituted alkyl, or alicyclic hydrocarbons having a —CH=CH— grouping in a ring of 3 or more carbon atoms. Stated another way, I prefer to employ olefinic compounds which would give primary and/or secondary mercaptans by simple addition of $H_2S$ as H— and —SH, since in general, the primary and secondary mercaptans are more stable and hence recoverable in higher yields than are the tertiary mercaptans. However, the stability of tertiary mercaptans varies with the molecular weight, those of lower molecular weight having the greater stability, and with the particular configuration of the carbon skeleton. Therefore, mercaptans derived from some of the more highly substituted ethylene derivatives such as $RR'C=CR''R'''$ where three or more of the substituent groups are hydrocarbon radicals are also within the scope of the invention.

Specific examples illustrative of the unsaturated hydrocarbons which can be used in accordance with the present invention are the following:

*Mono olefins*

Ethylene $CH_2=CH_2$

Propylene $CH_3CH=CH_2$ 1-butene $CH_3CH_2CH=CH_2$

Cis-2-butene
$$\begin{array}{c} CH_3CH \\ \parallel \\ CH_3CH \end{array}$$

Trans-2-butene
$$\begin{array}{c} CH_3CH \\ \parallel \\ HCCH_3 \end{array}$$

Methylpropene
$$\begin{array}{c} CH_3C=CH_2 \\ | \\ CH_3 \end{array}$$

1-pentene $CH_3CH_2CH_2CH=CH_2$ 2-pentene $CH_3CH_2CH=CHCH_3$ 1-heptene $CH_3CH_2CH_2CH_2CH_2CH=CH_2$ Dibutenes, e. g.,
$$\begin{array}{c} CH_3 \\ | \\ CH_3-C-CH_2-C=CH_2 \\ | \quad\quad | \\ CH_3 \quad CH_3 \end{array}$$

*Alicyclic hydrocarbons*

Methylcyclobutene
$$\begin{array}{c} CH_3C-CH_2 \\ \parallel \quad\quad \backslash \\ CH—CH_2 \end{array}$$

Cyclopentadiene
$$\begin{array}{c} CH=CH \\ |\quad\quad \backslash \\ \quad\quad\quad CH_2 \\ |\quad\quad / \\ CH=CH \end{array}$$

Cyclohexene
$$\begin{array}{c} CHCH_2CH_2 \\ \parallel \\ CHCH_2CH_2 \end{array}$$

1-methyl-1-cyclohexene
$$\begin{array}{c} CH_3C—CH_2CH_2 \\ \parallel \quad\quad\quad | \\ CHCH_2CH_2 \end{array}$$

In accordance with the present invention the phosphorus pentasulfide is added, preferably as a fine powder, to an excess of the unsaturated hydrocarbon employed, for example about 1 mole of the phosphorus pentasulfide and an amount exceeding about 2 moles of the unsaturated hydrocarbon by weight. If desired a suitable solvent such as benzene or a petroleum naphtha, preferably an olefin-free naphtha, may be employed. When such a solvent is used the reactants may be employed in the proportions of about 1 mole of phosphorus pentasulfide to about 2 moles of the unsaturated hydrocarbon. The mixture of phosphorus pentasulfide and unsaturated hydrocarbon is maintained with good agitation at about 100° F. to 400° F. for about 1 to 30 hours depending on the temperature and the hydrocarbon used. The reaction may be suitably carried out by refluxing in an inert gas which may be bubbled through the mixture to obtain better contact of the reactants. At the end of the heating period the mixture is filtered and the filtrate is freed of excess unsaturated hydrocarbon and any solvent, by distillation under reduced pressure or other suitable means. The residue remaining after the removal of the excess unsaturated hydrocarbon and solvent (if any) is then hydrolyzed by passing steam through the residue at a temperature of from about 200° F. to about 500° F. and preferably at about 250° F. to about 400° F. During the steam treatment the mercaptan if volatile is distilled together with a small amount of some lighter and heavier products. Upon completion of the steam treatment the distillate may be redistilled (under reduced pressure if desired) to obtain a constant boiling mercaptan fraction. If high molecular weight unsaturated hydrocarbons are employed the resulting mercaptans may be separated more effectively from the undesired products by extraction with suitable non-polar solvents, such as a light naphtha of such boiling range that it can later be separated readily from the extract.

The reaction between phosphorus pentasulfide and the unsaturated compound may sometimes be accomplished more rapidly under pressure—preferably at a pressure sufficient to maintain the olefin in a liquid phase—particularly in the case of the more volatile unsaturated compounds. The use of pressure is particularly important when gaseous olefins with low critical temperatures such as, for example, ethylene are used. Pressures up to about 100 atmospheres or more may be used.

The following specific example for the preparation of cyclohexyl mercaptan is intended to be illustrative of the present invention and not to be construed as a limitation thereof:

One part of phosphorus pentasulfide and two parts of cyclohexene by weight were placed in a flask and refluxed for 25 to 30 hours at about 180° F. while blowing nitrogen through the mixture. The reaction mixture was allowed to settle, and then decanted through a filter. The excess cyclohexene was removed in a pure state by distillation up to a temperature of about 300° F. in a stream of $CO_2$, vacuum being employed to remove traces of cyclohexene, leaving an amber-color resin-like residue. The residue was then hydrolyzed by passing steam through the same at a temperature of 400° F. and the mercaptan along with a small amount of some lighter and heavier products distilled. A distillate weighing 39% and a residue weighing 58% of the original charge were obtained.

The distillate was then distilled through a packed column and the following fractions obtained:

| Fraction No. | Boiling range | Refractive index ($n_d^{20}$) | Yield |
| --- | --- | --- | --- |
| | °F. | | Per cent |
| 1 | 173–200 | 1.451 | 9 |
| 2 | 200–309 | 1.479 | 8 |
| 3 | 309–312 | 1.4930 | 59 |
| Bottoms | | 1.5382 | 24 |

The following comparative data of fraction No. 3 and reported constants for cyclohexyl mercaptan establishes that fraction No. 3 is substantially pure cyclohexyl mercaptan.

| | Cyclohexyl mercaptan | Fraction No. 3 |
| --- | --- | --- |
| Refractive index ($n_d^{20}$) | | 1.4930 |
| Boiling point °F. | 311–320 | 309–312 |
| Molecular refraction ($MR_d$) | [1] 35.9 | 35.6 |

[1] Calculated.

In addition to the above data a solution of fraction No. 3 in sweet naphtha was titrated with copper solution and 25% mercaptan sulfur found, whereas the theoretical amount for cyclohexyl mercaptan is 27.6%.

While I have illustrated my invention with reference to the preparation of cyclohexyl mercaptan I do not wish to limit the invention thereto, but contemplate as within the scope of my invention the production of other mercaptans by the hydrolysis of the reaction product of phosphorus pentasulfide and other unsaturated hydrocarbons as hereinbefore defined.

I claim:

1. The method of preparing mercaptans comprising hydrolyzing the reaction product of phosphorus pentasulfide and an unsaturated hydrocarbon.

2. The method of preparing mercaptans comprising hydrolyzing the reaction product of phosphorus pentasulfide and a hydrocarbon containing at least one olefinic double bond.

3. The method of preparing mercaptans comprising hydrolyzing the reaction product of phosphorus pentasulfide and a mono-olefin hydrocarbon.

4. The method of preparing mercaptans comprising hydrolyzing the reaction product of phosphorus pentasulfide and an unsaturated alicyclic hydrocarbon.

5. The method of preparing mercaptans comprising hydrolyzing the reaction product of phosphorus pentasulfide and a polyene hydrocarbon.

6. The method of preparing mercaptans comprising hydrolyzing the reaction product of phosphorus pentasulfide and cyclohexene.

7. The method of preparing mercaptans comprising reacting about one mole of phosphorus pentasulfide and about two moles of an unsaturated hydrocarbon, separating the unreacted reactants from the reaction product, hydrolyzing said reaction product with steam at a temperature of from about 200° F. to about 500° F. and separating the mercaptan fraction from the hydrolyzed reaction product.

8. The method of preparing mercaptans comprising reacting about one mole of phosphorus pentasulfide and about two moles of an olefin hydrocarbon, separating the unreacted reactants from the reaction product, hydrolyzing said reaction product with steam at a temperature of from about 200° F. to about 500° F. and separating the mercaptan fraction from the hydrolyzed reaction product.

9. The method of preparing mercaptans comprising reacting about one mole of phosphorus pentasulfide and about two moles of cyclohexene, separating the unreacted reactants from the reaction product, hydrolyzing said reaction product with steam at a temperature of from about 200° F. to about 500° F. and separating the mercaptan fraction from the hydrolyzed reaction product.

10. The process of obtaining mercaptans comprising refluxing a mixture comprising about one mole of phosphorus pentasulfide and an amount exceeding about two moles of an unsaturated hydrocarbon at a temperature of from about 100° F. to about 400° F. while bubbling an inert gas through said mixture, filtering the reaction mixture, separating the excess hydrocarbon from the filtrate, hydrolyzing the reaction product by passing steam therethrough at a temperature of from about 200° F. to about 500° F. and subsequently recovering the desired mercaptan fraction by distillation.

11. The process of obtaining mercaptans comprising refluxing a mixture comprising about one mole of phosphorus pentasulfide and an amount exceeding about two moles of an olefin hydrocarbon at a temperature of from about 100° F. to about 400° F., filtering the reaction mixture, separating the excess hydrocarbon from the filtrate, hydrolyzing the reaction product by passing steam therethrough at a temperature of from about 200° F. to about 500° F. and subsequently recovering the desired mercaptan fraction by distillation.

12. The process of obtaining mercaptans comprising refluxing a mixture comprising about one mole of phosphorus pentasulfide and an amount exceeding about two moles of an unsaturated alicyclic hydrocarbon at a temperature of from about 100° F. to about 400° F., filtering the reaction mixture, separating the excess hydrocarbon from the filtrate, hydrolyzing the reaction product by passing steam therethrough at a temperature of from about 200° F. to about 500° F. and subsequently recovering the desired mercaptan fraction by distillation.

13. The method of preparing cyclohexyl mercaptan comprising reacting a mixture comprising one part phosphorus pentasulfide and two parts cyclohexene, for about 25 to about 30 hours at a temperature of about 180° F. by blowing nitrogen through the mixture, filtering the reaction mixture, distilling the filtrate at a temperature of about 300° F. to remove the excess cyclohexene, hydrolyzing the residue from said distillation by passing steam through the same at a temperature of about 400° F. to obtain a distillate containing cyclohexyl mercaptan and subsequently distilling said distillate to obtain the desired cyclohexyl mercaptan fraction.

14. The method of preparing mercaptans comprising hydrolyzing the reaction product of phosphorus pentasulfide and a hydrocarbon containing at least one non-benzenoid double bond.

15. The method described in claim 14 in which the hydrocarbon contains from 2 to about 12 carbon atoms in the molecule.

16. The process of obtaining mercaptans comprising refluxing a mixture comprising about one mole of phosphorus pentasulfide, about two moles of an unsaturated hydrocarbon, and a solvent at a temperature of from about 100° F. to about 400° F., filtering the reaction product, separating the excess hydrocarbon from the filtrate, hydrolyzing the reaction product by passing steam therethrough at a temperature of from about 200° F. to 500° F. and subsequently recovering the desired mercaptan fraction by distillation.

CARL MAX HULL.